US006847372B2

(12) United States Patent
Emberling et al.

(10) Patent No.: US 6,847,372 B2
(45) Date of Patent: Jan. 25, 2005

(54) MAGNIFIED TEXTURE-MAPPED PIXEL PERFORMANCE IN A SINGLE-PIXEL PIPELINE

(75) Inventors: Brian D. Emberling, San Mateo, CA (US); Michael G. Lavelle, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 104 days.

(21) Appl. No.: 10/094,934

(22) Filed: Mar. 11, 2002

(65) Prior Publication Data

US 2003/0169270 A1 Sep. 11, 2003

(51) Int. Cl.[7] .................................................. G09G 5/00

(52) U.S. Cl. ....................... 345/582; 345/583; 345/587; 345/552

(58) Field of Search ................................. 345/582, 552

(56) References Cited

U.S. PATENT DOCUMENTS 6,313,846 B1 * 11/2001 Fenney et al. ............. 345/552

6,342,892 B1 * 1/2002 Van Hook et al. .......... 345/503

* cited by examiner

*Primary Examiner*—Matthew C. Bella
*Assistant Examiner*—Tam Tran
(74) *Attorney, Agent, or Firm*—Meyertons Hood Kivlin Kowert & Goetzel, P.C.; Jeffrey C. Hood

(57) ABSTRACT

A system and a method for improving magnified texture-mapped pixel performance in a single-pixel pipeline. Two textured pixel addresses corresponding to two pixels may be generated. The two textured pixel addresses may then be passed to the next unit in the pipeline, where the two textured pixel addresses can be examined if the corresponding two pixels correspond to a common set of texels in texture space. The two textured pixel addresses may be merged together if the two pixels correspond to the common set of texels. Merging may operate to create a combined texel structure. Texel data may be generated in response to receiving the combined texel structure. The texel data may be filtered using one or more texture filters in order to generate texture values.

43 Claims, 10 Drawing Sheets

MAGNIFIED TEXTURE-MAPPED PIXEL PERFORMANCE IN A SINGLE-PIXEL PIPELINE

BACKGROUND OF THE INVENTION

1. Field of the Invention

This invention relates generally to the field of computer graphics and, more particularly, to performance optimization of graphic pipelines.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

A modern graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly filtered to form pixels that are provided directly to refresh the display without any intervening frame buffer storage of the pixels.

The pixels are converted into an analog video signal by digital-to-analog converters. If samples are used, the samples may be read out of sample buffer or frame buffer and filtered to generate pixels, which may be stored and later conveyed to digital to analog converters. The video signal from converters is conveyed to a display device such as a computer monitor, LCD display, or projector.

Furthermore, many implementations of graphics systems may have limited amount of space available for implementing a graphic processor. Improvements are possible in the implemetation of a graphic pipeline, especially the processing of textured pixel addresses. Therefore would be advantegous to improve the performance of a graphic processor without generating many additional components.

SUMMARY OF THE INVENTION

The problems set forth above may at least in part be solved in some embodiments by a system or a method for improving magnified texture-mapped pixel performance in a single-pixel pipeline.

The method may comprise generating two textured pixel addresses corresponding to two pixels using one or more texture address generators. In other words, each of the two pixels may have a corresponding textured pixel address. The generation of the textured pixel address may be performed using any of the algorithms known in the art. The two textured pixel addresses may then be passed to a next unit in the pipeline.

The method may comprise using a merge unit operable to examine the two textured pixel addresses received from the one or more texture address generators. This examination may determine if the two pixels correspond to a common set of texels in the texture space.

The method may make a decision based on whether the two pixels have identical texel composition. In other words, the method may make a decision based on whether the two pixels correspond to the common set of texels in the texture space. The method may comprise merging the two textured pixel addresses if the two pixels correspond to the common set of texels. Merging may operate to create a combined texel structure. In another embodiment, the two pixels may not correspond to the common set of texels, and the method may generate texel data without merging the two textured pixel addresses.

The method may comprise generating texel data in response to receiving the combined texel structure using a texture buffer. In one embodiment, the texture buffer may generate texel data for one or more textured pixel addresses at the same time.

The method may comprise filtering the texel data received from the texture memory unit using one or more texture filters in order to generate a first and a second texture value.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
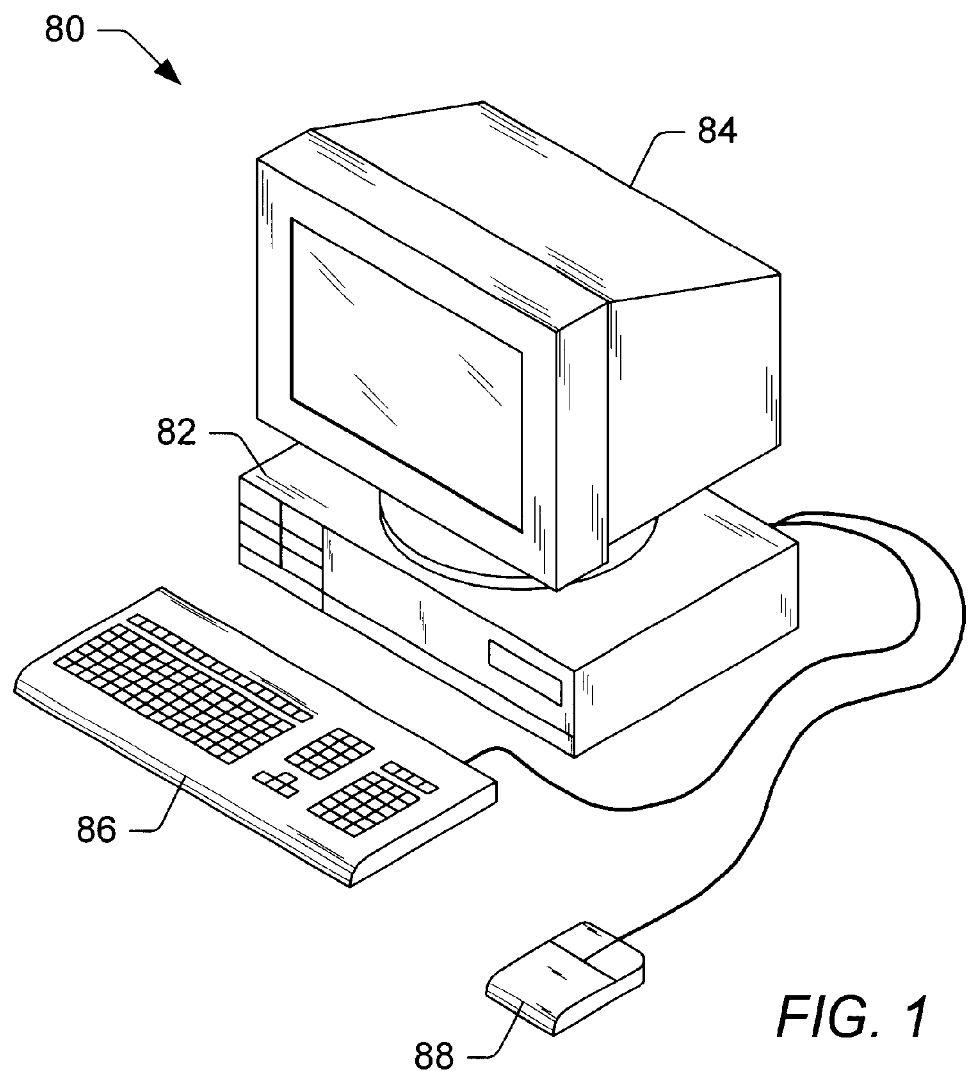
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
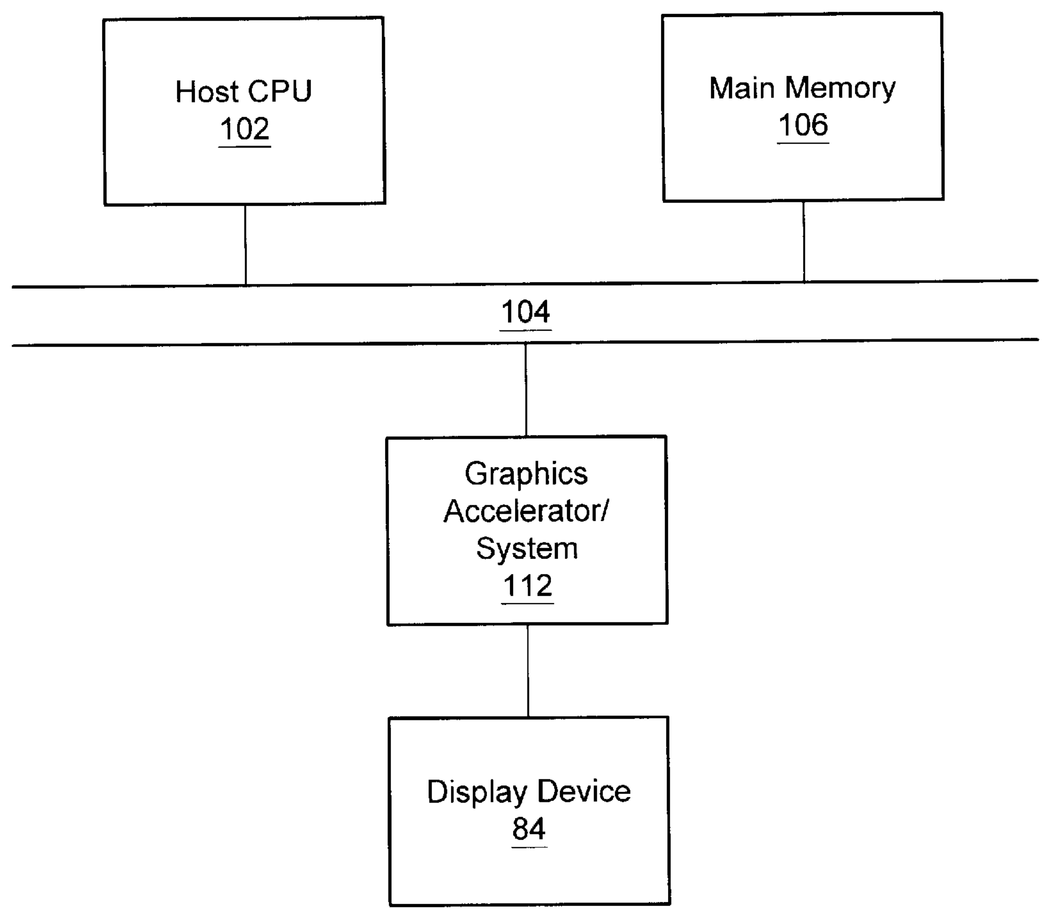
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
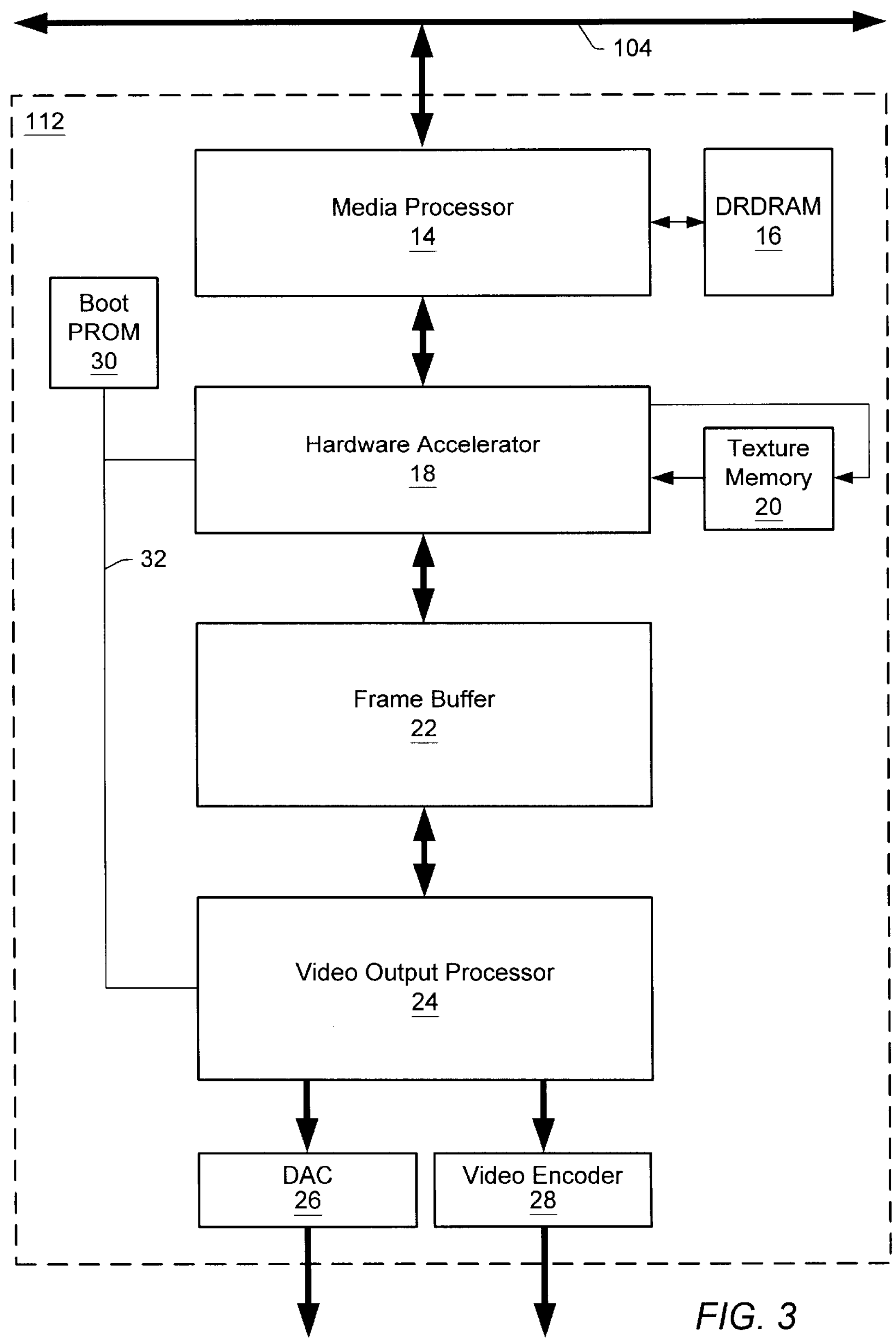
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
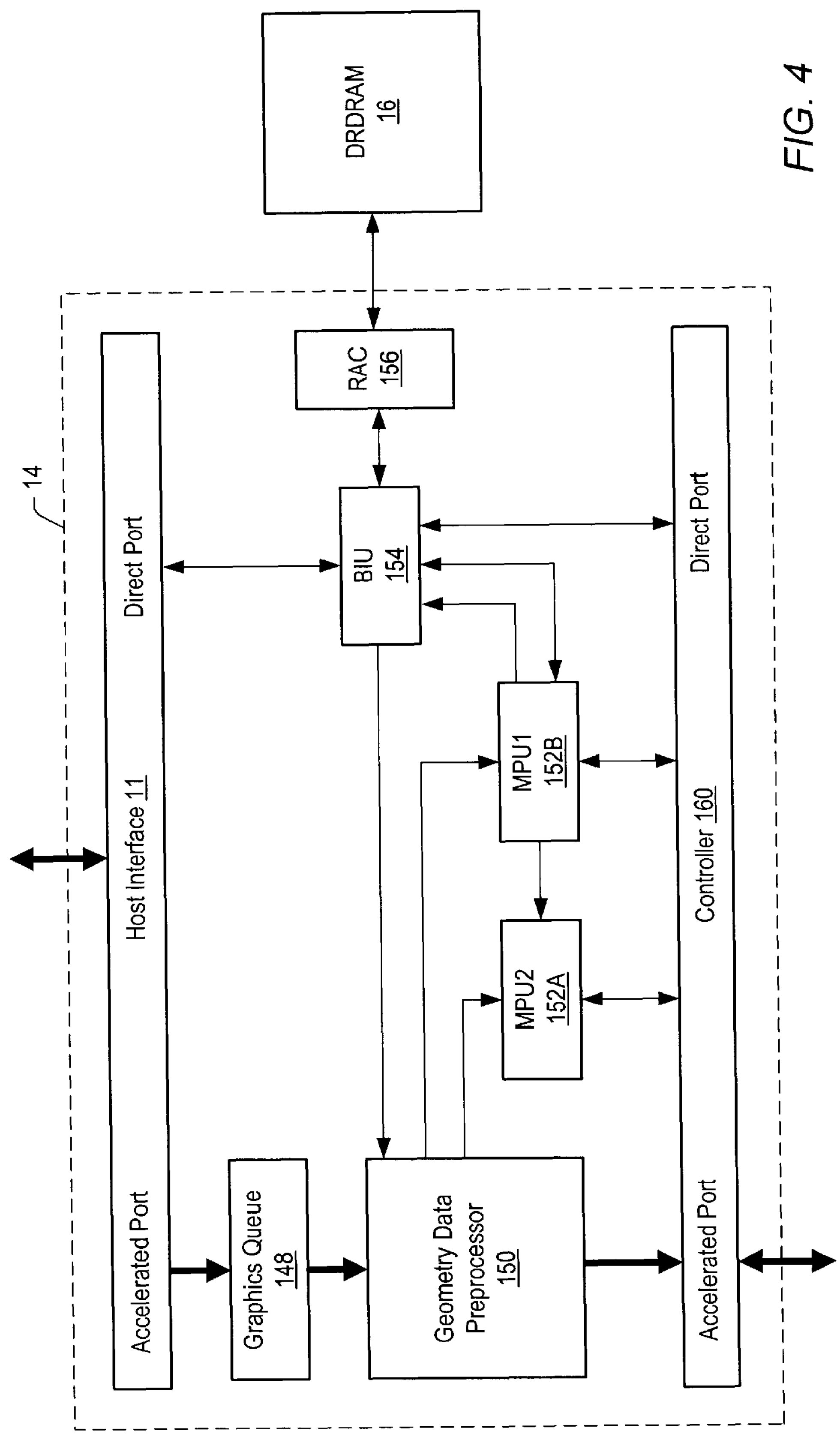
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), nonlinear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU)

154. Bus interface unit 154 provides a path to memory 16 and a path to hardware accelerator 18 and video output processor 24 via controller 160.

Figure 5:
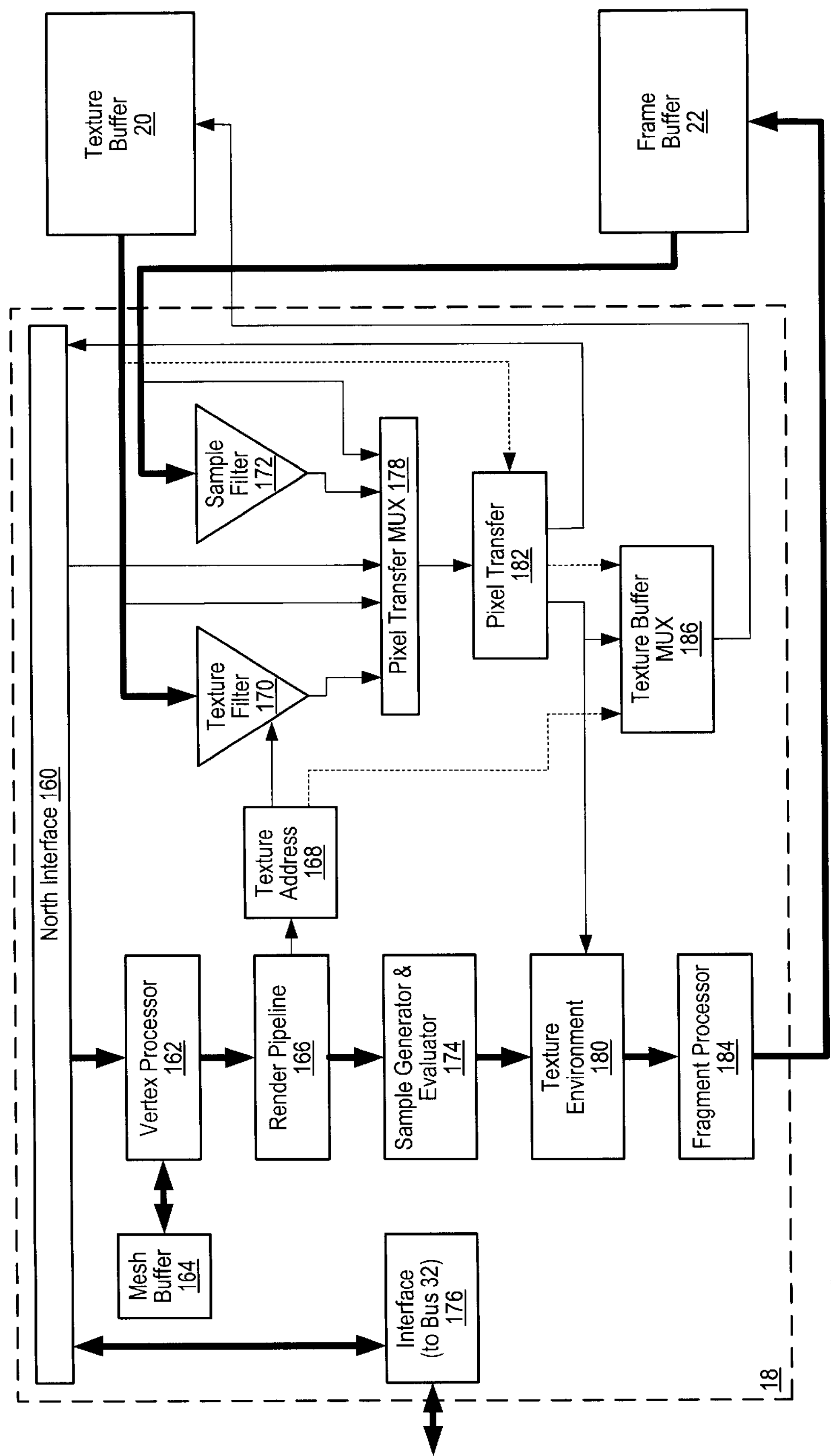
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using super-sampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
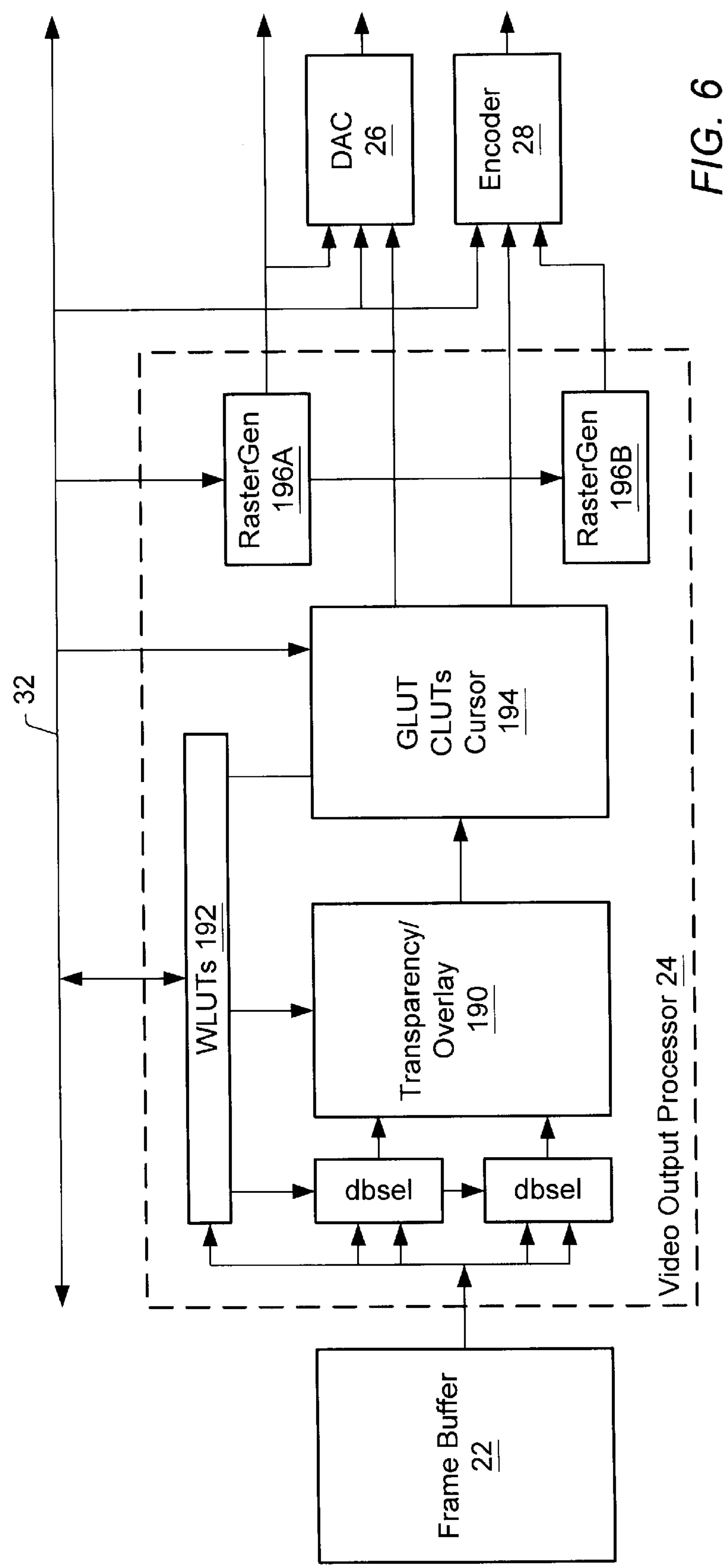
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
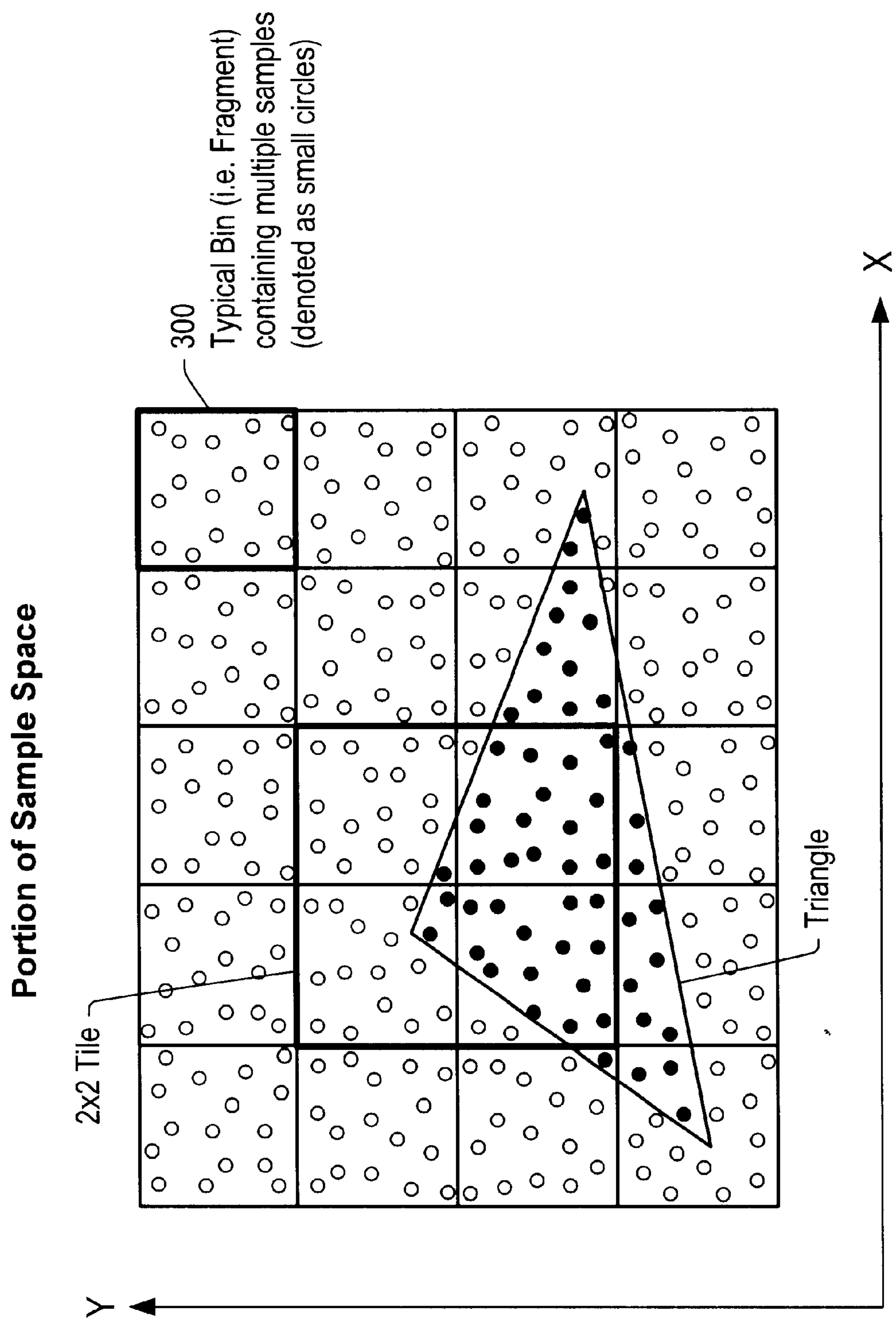
FIG. 7 is an illustration of a sample space partitioned into an array of bins, according to one embodiment.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins as illustrated in FIG. 7. Each bin may contain one or more samples. The number of samples per bin may be a programmable parameter.

Figure 8A:
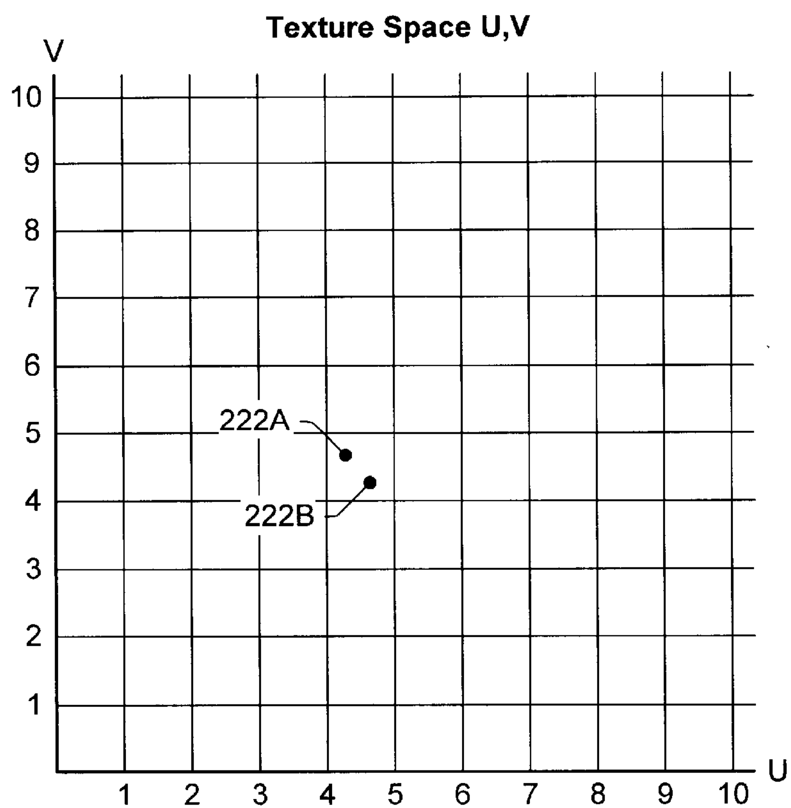
FIG. 8A is an illustration of a texture space partitioned into an array of bins, according to one embodiment.

Texture Space Partitioned into an Array of Bins—FIG. 8A

FIG. 8A is an illustration of a texture space partitioned into an array of bins, according to one embodiment. The texture space may comprise U and V coordinates, which may correspond to horizontal and vertical coordinates respectively. FIG. 8A shows a portion of the actual texture space where the U and V coordinates are marked with exemplary units. A pixel in screen space may correspond to a textured pixel address in texture space. Therefore, referring to FIG. 8A, two textured pixel addresses 222A and 222B in texture space may correspond to two pixels in screen space.

The textured pixel address may comprise U and V coordinates. The U and V coordinate each may include an integer and a fractional component. For example, referring to FIG. 8A, the textured pixel address 222A may have (U, V) coordinates of (4.3, 4.8). For example, referring to the textured pixel address 222A, the integer component of the U coordinate of the textured pixel address 222A may be (4) and the fractional component of the U coordinate of the textured pixel address 222A may be (0.30).

In one embodiment, the two pixels 220A and 220B, corresponding to the textured pixel addresses 222A and 222B respectively, may map to the same texel (or correspond to a common set of texels) if the integer component of the textured pixel address 222A is the same as the integer component of the textured pixel address 222B. The fractional components of the textured pixel address 222A and the textured pixel address 222B may be different.

When rendering textured mapped images, there may be a mixture of minified and magnified textured pixels. Although the ratio of minified versus magnified textured pixels may be equal, the percentage of pixels on the screen may be dominated by a few magnified triangles, i.e., that may be used to render the sky and ground in a flight simulator. Therefore, performance gains may be realized by using a method for improving magnified textured-mapped pixel performance in a single-pixel pipeline. In one embodiment, for each magnified pixel, each step in screen space may correspond to less then one texel step in texture space. Screen space may use X and Y coordinates for mapping pixels, whereas texture space may use U and V coordinates for mapping texels.

Figure 8B:
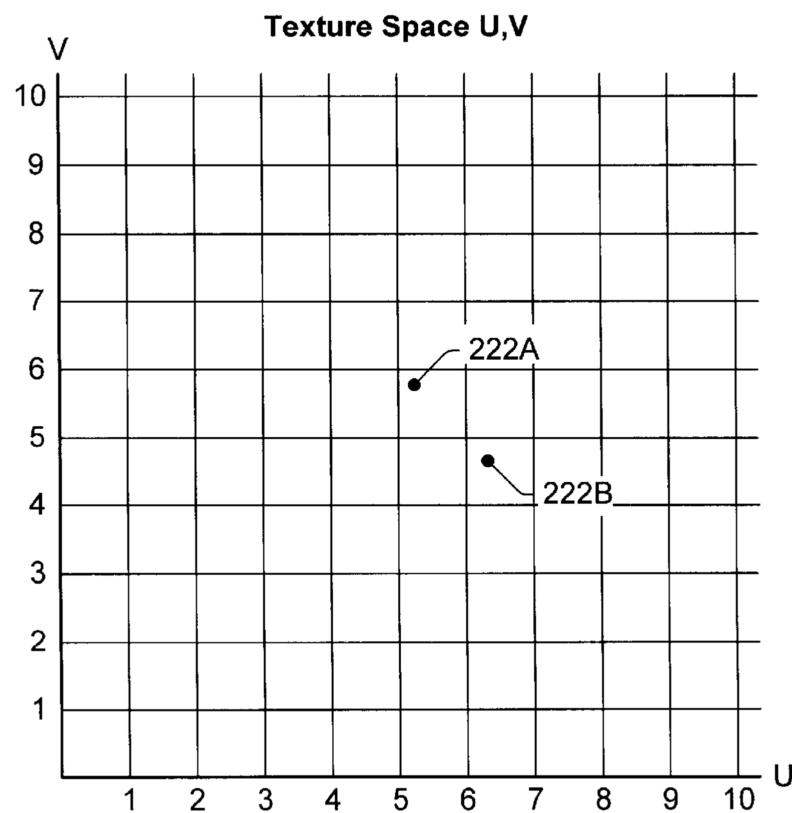
FIG. 8B is an illustration of a texture space partitioned into an array of bins, according to another embodiment.

Texture Space Partitioned into an Array of Bins—FIG. 8B

FIG. 8B is an illustration of the texture space partitioned into an array of bins, according to another embodiment. FIG. 8B shows a portion of the actual texture space where the U and V coordinates are marked with exemplary units.

In one embodiment, the textured pixel addresses 222A and 222B may not map to the same texel (or correspond to a common set of texels). In other words, the integer component of the textured pixel address 222A may be different from the integer component of the textured pixel address 222B, resulting in a different texel, or a different set of texels, for each of the first textured pixel address 222A and the second textured pixel address 222B.

Figure 9:
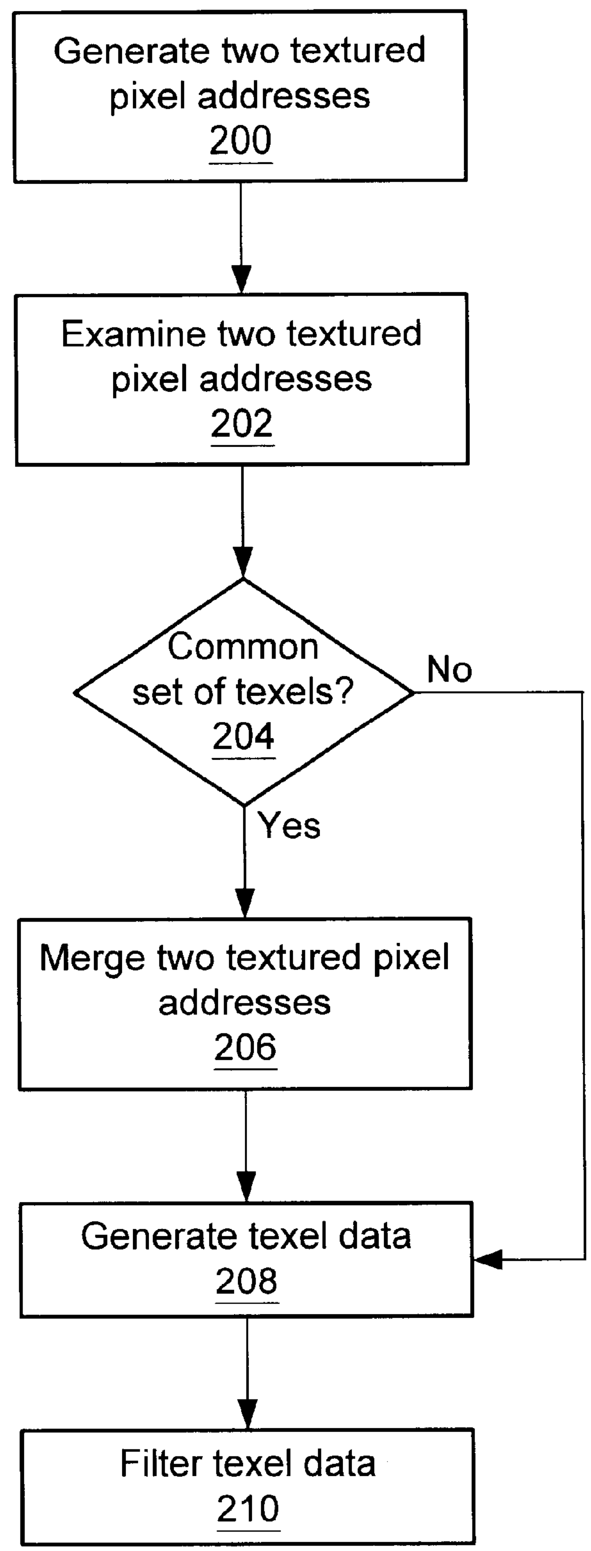
FIG. 9 is a flowchart illustrating a method for improving magnified textured-mapped pixel performance in a single-pixel pipeline, according to one embodiment.

A Method for Improving Magnified Textured-mapped Pixel Performance in a Single-pixel Pipeline—FIG. 9

FIG. 9 is a flowchart illustrating a method for improving magnified textured-mapped pixel performance in a single-pixel pipeline, according to one embodiment. The following discussion refers to FIGS. 9 and 10.

In step 200, the method may comprise generating the two textured pixel addresses 222A and 222B corresponding to the two pixels 220A and 220B using one or more texture address generators 168A and 168B. In other words, each of the two pixels 220A and 220B, also referred to herein as the first pixel 220A and the second pixel 220B, may have a corresponding textured pixel address 222A and 222B respectively. The generation of the textured pixel address may be performed using any of the algorithms known in the art. The two textured pixel addresses 222A and 222B may then be passed to the next unit in the pipeline.

In step 202, the method may comprise using a merge unit 168C operable to examine the two textured pixel addresses 222A and 222B received from the one or more texture address generators 168A and 168B. This examination may determine if the two pixels 220A and 220B correspond to the common set of texels in the texture space. The examination may be performed by control logic. The control logic may be comprised in the merge unit 168C, and may be operable to generate control bits comprising the result of the examination.

In step 204, the method may make a decision based on whether the two pixels 220A and 220B have identical texel composition. In other words, the method may make a decision based on whether the two pixels 220A and 220B correspond to the common set of texels in the texture space. In one embodiment, as described above with reference to FIG. 8A, the first pixel 220A and the second pixel 220B may correspond to the common set of texels. In other words, the first textured pixel address 222A and the second pixel 222B may have the same integer components of their respective U and V coordinates.

In another embodiment, as described above with reference to FIG. 8B, the first pixel 220A and the second pixel 220B may not correspond to the common set of texels. In other words, the first textured pixel address 222A and the second pixel 222B may not have the same integer components of their respective U and V coordinates. If the the first pixel 220A and the second pixel 220B do not correspond to the common set of texels, the method may proceed directly to step 208.

In step 206, the method may comprise merging the two textured pixel addresses 222A and 222B if the first pixel 220A and the second pixel 220B correspond to the common set of texels. Merging may operate to create a combined texel structure 224, also referred to as a single result 224.

In step 208, the method may comprise generating texel data 226 in response to receiving the combined texel structure 224 using a texture buffer 20, also referred to as the texture memory unit 20. In one embodiment, the texture buffer 20 may generate texel data 226 for one or more textured pixel addresses at the same time.

In step 210, the method may comprise filtering the texel data 226 received from the texture memory unit 20 using one or more texture filters 170A and 170B in order to generate a first and a second texture value 228A and 228B respectively, also referred to as the first textured pixel 228A and the second textured pixel 228B respectively.

It is noted that the flowchart of FIG. 9 is exemplary only. Further, various steps in the flowchart of FIG. 9 may occur concurrently or in different order than that shown, or may not be performed, as desired. Also, various additional steps may be performed as desired.

Figure 10:
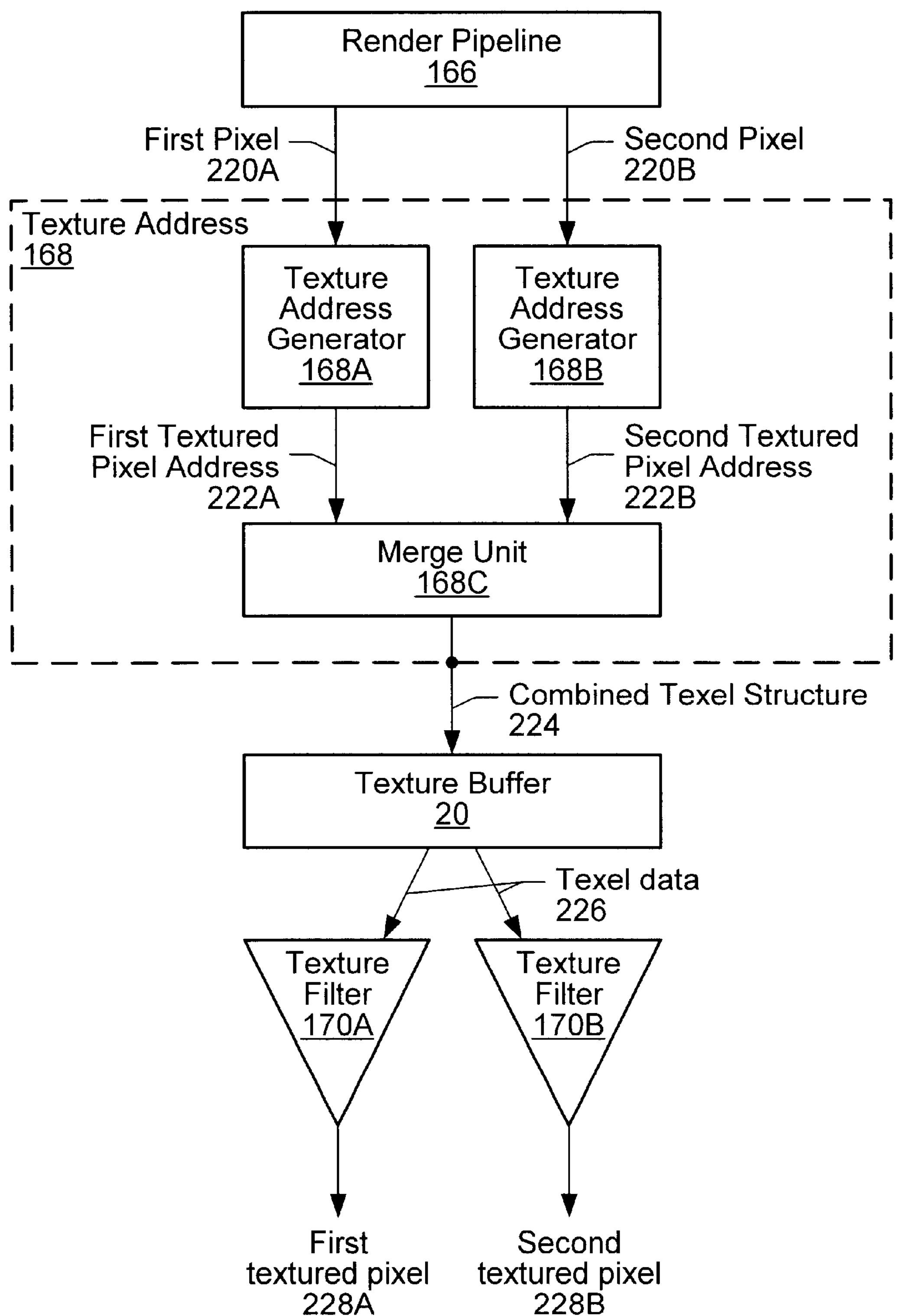
FIG. 10 is a block diagram of the system used to improving magnified textured-mapped pixel performance in a single-pixel pipeline, according to one embodiment.

System Used to Improving Magnified Textured-mapped Pixel Performance in a Single-pixel Pipeline—FIG. 10

FIG. 10 shows one embodiment for a block diagram of the system used to improve magnified textured-mapped pixel performance in a single-pixel pipeline. In other embodiments, the pipeline may be used for general purposes.

In one embodiment, two pixels 220A and 220B may be propagated down the render pipeline 166 into the texture address unit 168. The texture address unit 168 may comprise one or more texture address generators 168A and 168B and a merge unit 168C. The one or more texture address generators 168A and 168B may be operable to generate the two textured pixel addresses 222A and 222B respectively, also referred to as the first and second pair of texture coordinates 222A and 222B respectively, corresponding to the two pixels 220A and 220B respectively. The generation of the textured pixel address may be performed using any of the algorithms known in the art.

In one embodiment, the merge unit 168C may comprise control logic, operable to examine texel requirements of each of the two textured pixel addresses 222A and 222B in order to create control bits indicating whether the two pixels 220A and 220B have identical texel composition. An example of examining texel requirements of each of the two textured pixel addresses 222A and 222B is described above with reference to FIGS. 8A, 8B, and 9. In one embodiment, the two texture coordinates may be passed from the one or more texture address generators 168A and 168B to the merge unit 168C using a FIFO queue.

In one embodiment, the merge unit 168C may be operable to create the combined texel structure 224 if the control bits indicate identical texel composition for the two pixels 220A and 220B. The combined texel structure may comprise the two textured pixel addresses 222A and 222B merged together.

In one embodiment, the texture memory unit 20, also referred to as the texture buffer 20, may be operable to receive the combined texel structure 224 from the merge unit 168C. The texture memory unit 20 may be further operable to generate the texel data 226. The texture memory unit 20 may be operable to generate the texel data 226 for one or more textured pixel addresses at the same time.

In one embodiment, the one or more texture filters 170A and 170B, also referred to as the first texture filter 170A and the second texture filter 170B respectively, may be operable to receive the texel data 226 from the texture memory unit 20 and to filter the texel data 226 to generate the two textured pixels 228A and 228B, also referred to as the first textured pixel 228A and the second textured pixel 228B respectively. The first and second texture filters 170A and 170B may use both the integer and fractional components of the U and V coordinates.

It is noted that the block diagram of FIG. 10 is exemplary only. Further, various modules in the block diagram of FIG. 10 may be connected in different order than that shown, or may not be present, as desired. Also, various additional modules may be included as desired.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for improving magnified texture-mapped pixel performance in a computational pipeline, comprising:

generating two textured pixel addresses corresponding to two pixels;

examining the two textured pixel addresses in order to determine if the two pixels correspond to a common set of texels;

merging the two textured pixel addresses if said examining, determines that the two pixels correspond to a common set of texels, wherein said merging operates to create a combined texel structure;

said texture memory generating texel data in response to receiving the combined texel structure;

filtering the texel data with a first texture filter in order to generate a first texture value corresponding to a first of the two pixels; and filtering the texel data with a second texture filter in order to generate a second texture value corresponding to a second of the two pixels.

2. The method of claim 1, wherein each one of the two pixels is magnified.

3. The method of claim 1, wherein for each one of the two magnified pixels, each step in screen space corresponds to less than one texel step in texture space.

4. The method of claim 3, wherein the screen space comprises X and Y coordinates.

5. The method of clam 3, wherein the texture space comprises U and V coordinates.

6. The method of claim 1, wherein each one of the two textured pixel addresses comprises U and V coordinates, wherein the U and V coordinates each comprises an integer and a fractional component.

7. The method of claim 6, wherein said examining uses the integer components of the U and V coordinates of each of the two textured pixel addresses.

8. The method of claim 6, wherein the combined texel structure comprises the integer components of the U and V coordinates.

9. The method of claim 8, wherein the combined texel structure comprises the fractional components of the U and V coordinates.

10. The method of claim 9, wherein the texture filters use both the integer and fractional components of the U and V coordinates of the combined texel structure.

11. The method of claim 1, wherein the two textured pixel addresses are comprised in a FIFO queue.

12. The method of claim 1, wherein said generating comprises generating the texel data for one or more textured pixel addresses at the same time.

13. The method of claim 1, wherein the texel data comprises the common set of texels.

14. A system for improving magnified textured pixel performance in a computational pipeline, comprising:

two texture address generators, operable to generate two textured pixel addresses respectively corresponding to two pixels respectively;

control logic, operable to examine texel requirements of each of the two textured pixel addresses in order to create control bits indicating whether the two pixels have identical texel composition;

a merge unit operable to create a combined texel structure if the control bits indicate identical texel composition for the two pixels, wherein the combined texel structure comprises the two textured pixel addresses merged together;

a texture memory unit operable to receive the combined texel structure from the merge unit, wherein the texture memory unit is further operable to generate texel data in response to receiving the combined texel structure;

a first texture filter operable to receive the texel data and to filter the texel data to generate a first textured pixel;

a second texture filter operable to receive the texel data and to filter the texel data to generate a second textured pixel.

15. The system of claim 14, wherein the merge unit is alternatively operable to propagate the two separated textured pixel addresses if the control bits indicate different texel composition for the two pixels.

16. The system of claim 14, wherein the two texture filters are further operable to decode the control bits.

17. The system of claim 14, wherein each one of the two pixels is magnified.

18. The system of claim 17, wherein for each one of the two magnified pixels, each step in screen space corresponds to less than one texel step in texture space.

19. The system of claim 18, wherein the screen space comprises X and Y coordinates.

20. The system of clam 18, wherein the texture space comprises U and V coordinates.

21. The system of claim 14, wherein each one of the two textured pixel addresses comprises U and V coordinates, wherein the U and V coordinates each comprises an integer and a fractional component.

22. The system of claim 21, wherein the combined texel structure comprises the integer components of the U and V coordinates.

23. The system of claim 22, wherein the combined texel structure comprises the fractional components of the U and V coordinates.

24. The system of claim 23, wherein the two texture filters use both integer and fractional components of the U and V coordinates of the combined texel structure.

25. The system of claim 21, wherein the control logic examines integer components of the U and V coordinates of each of the two textured pixel addresses when examining the texel requirements of each of the two textured pixel addresses.

26. The system of claim 14, wherein the merge unit comprises the control logic.

27. The system of claim 14, wherein the two textured pixel addresses are passed from two texture address generators to the merge unit using a FIFO queue.

28. The system of claim 14, wherein the identical texel composition indicates that the two pixels correspond to a common set of texels stored in the texture memory unit.

29. The system of claim 14, wherein the texture memory unit is operable to generate texel data for one or more textured pixel addresses at the same time.

30. A system comprising:

a first and second texture filter;

a texture memory;

a first and second texture address generator configured to generate a first and second pair of texture coordinates respectively, in response to receiving a first pixel position and a second pixel position respectively;

a merge unit configured to determine if the first and second pair of texture coordinates correspond to a common set of texels on a texture map, and to send a single request for the common set of texels to the texture memory unit if the first and second pair of texture coordinates correspond to the common set of texels;

wherein the texture memory unit is configured to provide the common set of texels to the first and second texel filters in response to the single request;

wherein the first and second texture filters are configured to filter the common set of texels to generate a first and second texture value respectively for the first and second pixel position respectively.

31. The system of claim 30, wherein the single request for the common set of texels comprises a combined texel structure.

32. The system of claim 30, wherein the combined texel structure comprises the first and second pair of texture coordinates merged together.

33. The system of claim 30, wherein two pixels corresponding to the first and the second pixel positions respectively are both magnified.

34. The system of claim 33, wherein for each one of the two pixels, each step in screen space corresponds to less than one texel step in texture space.

35. The system of claim 34, wherein the screen space comprises X and Y coordinates.

36. The system of clam 34, wherein the texture space comprises U and V coordinates.

37. The system of claim 30, wherein each one of the first and the second pair of texture coordinates comprises U and V coordinates, wherein the U and V coordinate each comprises an integer and a fractional component.

38. The system of claim 37, wherein said examining uses the integer components of the U and V coordinates of each of the first and the second pair of texture coordinates.

39. The system of claim 37, wherein the single request comprises the integer components of the U and V coordinates.

40. The system of claim 39, wherein the single request comprises the fractional components of the U and V coordinates.

41. The system of claim 40, wherein the first and second texture filters use both the integer and fractional components of the U and V coordinates.

42. The system of claim 30, wherein the first and the second pair of texture coordinates are passed from the first and second texture address generator to the merge unit using a FIFO queue.

43. A system for improving magnified texture-mapped pixel performance in a computational pipeline, comprising:

means for generating two textured pixel addresses corresponding to two pixels;

means for examining the two textured pixel addresses in order to determine if the two pixels correspond to a common set of texels;

means for merging the two textured pixel addresses if said examining determines that the two pixels correspond to a common set of texels, wherein said merging operates to create a combined texel structure;

means for storing information, wherein said storing means is configured to generate texel data in response to receiving the combined texel structure; and means for filtering the texel data in order to generate a first texture value corresponding to a first of the two pixels;

means for filtering the texel data in order to generate a second texture value corresponding to a second of the two pixels.

* * * * *

UNITED STATES PATENT AND TRADEMARK OFFICE

CERTIFICATE OF CORRECTION

PATENT NO. : 6,847,372 B2
DATED : January 25, 2005
INVENTOR(S) : Emberling et al.

It is certified that error appears in the above-identified patent and that said Letters Patent is hereby corrected as shown below:

Column 13,
Line 61, please delete "Clam" and substitute -- Claim --

Column 14,
Line 58, please delete "Clam" and substitute -- Claim --

Column 16,
Line 6, please delete "Clam" and substitute -- Claim --

Signed and Sealed this

Third Day of May, 2005

JON W. DUDAS
*Director of the United States Patent and Trademark Office*